United States Patent [19]

Nahlovsky

[11] Patent Number: 5,132,355

[45] Date of Patent: Jul. 21, 1992

[54] GELS OF POLYETHYLENE BLOCK COPOLYMERS AND LIQUID HYDROCARBONS

[76] Inventor: Boris Nahlovsky, 3276 Amethyst La., Cameron Park, Calif. 95682

[21] Appl. No.: 618,176

[22] Filed: Nov. 26, 1990

[51] Int. Cl.$^5$ .......................... C08J 3/00; C08K 5/01; C08L 91/08
[52] U.S. Cl. .................................. 524/474; 524/488; 525/321; 525/323
[58] Field of Search ................. 524/474, 488; 525/321, 525/323

[56] References Cited

U.S. PATENT DOCUMENTS 4,709,982 12/1987 Corne et al. .................... 524/474

FOREIGN PATENT DOCUMENTS 135253 3/1985 European Pat. Off. ............ 524/474

Primary Examiner—Paul R. Michl
Assistant Examiner—Patrick Niland
Attorney, Agent, or Firm—Mark C. Jacobs

[57] ABSTRACT

Liquid hydrocarbons are gelled by polyethylene block copolymers (PEBC's) to yield storage stable gels and sols that contain no metal-containing gelling agents and which compositions are thermally reversible; i.e., they melt into homogeneous liquids upon heating and upon cooling resume their previous state as a gel or sol.

The PEBC gelling agents are block copolymers consisting of quasi-polyethylene crystalline "hard" blocks A and amorphous hydrocarbon "soft" blocks B. Crystallinity of the blocks A imparts the gel or sol with a sharp melting point which is dependent upon the PEBC chemical composition and concentration within the hydrocarbon. The gels and sols may contain suspended solid particles, such as powdered metals, fillers or oxidizers and are pumpable even when these suspended particles are present.

28 Claims, No Drawings

5,132,355

GELS OF POLYETHYLENE BLOCK COPOLYMERS AND LIQUID HYDROCARBONS

FIELD OF THE INVENTION

This invention relates to gelled liquid hydrocarbons, and more specifically to thermally-reversible gels and sols formed by the admixture of liquid hydrocarbons with polyethylene block copolymer gelling agents.

BACKGROUND OF THE INVENTION

Description of Prior Art

Heretofore, conversion of liquid hydrocarbons into gels was accomplished by the addition of various gelling or emulsifying agents. These agents fell into one of five distinct classes: (1) the metal soaps, (2) polymers, (3) particulates, (4) the reaction products of amines and organic diisocyanates, or (5) the alkyl-hydroxybutyramides. Aluminum octoate is the most common hydrocarbon gelling agent in current use.

Hydrocarbon gels are used in many applications and may or may not contain suspended particulated solid matter, such as finely divided aluminum. Gels with or without suspended particles are used in incendiary devices, in rocket and jet fuels and in antimisting aviation fuels among other purposes.

Whereas a gel is defined in "The Condensed Chemical Dictionary" as a colloid in which the disperse phase has combined with the continuous phase to produce a viscous jellylike product; a sol is defined there as a "liquid colloidal dispersion". Sols are solutions of various substances in liquids which differ is rheology from gels by being free-flowing.

However, gels and sols as well which incorporate gelling agents of the above listed five types suffer from a number of disadvantages. These include:

(a) the presence of the metal or other inorganic atoms in the gel which can produce residual ash upon combustion that can be detrimental to mechanical parts;

(b) instability after prolonged storage for several years or even months; often resulting in the separation of the liquid hydrocarbon, gelling agent and suspended solids.

(c) some gels are not true gels but viscous liquids and do not have shear-thinning rheology which is required for some known applications for gels.

(d) the above listed gels are formed irreversibly, i.e., they cannot be converted back into a homogeneous liquid once formed.

One example of the problems of current hydrocarbon gels and sols that is easily illustrated is that associated with antimisting fuels. Antimisting fuels are ones that are supposed to not form a mist of very tiny droplets when an airplane crashes. The fine droplets, in the form almost of a vapor, have an extensive surface area and are thus prone to combustion. Therefore it is desired in the field of aviation to reduce the fire hazard of aircraft crashes by suppression of the formation of a fireball by the utilization of antimisting fuel. However, currently used antimisting agents failed in an FAA aircraft crash test. While aluminum -2-ethylhexanoate (aluminum octoate) provides some benefits, according to the Final Summary Report DOT/FAA/CT-86/7 dated Apr. 1986 there is still a need for more effective antimisting agents.

OBJECTS AND ADVANTAGES

One object of this invention to provide improved gelling agents for liquid hydrocarbons.

Another object of this invention is to provide a gel consisting solely of hydrocarbon components. The gel contains only carbon and hydrogen atoms.

A further object is to provide a thermally-reversible gel; i.e., a gel that can be melted into a homogeneous liquid at elevated temperatures which liquid on cooling reverses to form a gel again.

A yet further object is provide a thermally reversible gel whose transition from one state to another and back occurs in a narrow temperature range.

A still further object of this invention is to provide a gel that is stable over prolonged storage of up to twenty years.

Even further objects include the provision of gels with sheer-thinning rheology and/or antimisting characteristics.

An additional object is to provide gels and sols that utilize polyethylene block copolymers (PEBC's) as the gelling agents.

Other objects of the invention will in part be obvious and will in part appear hereinafter.

The invention accordingly comprises the products possessing the features properties and the relation of components which are exemplified in the following detailed disclosure and the scope of which will be indicated in the appended claims.

For a fuller understanding of the nature and objects of the invention, reference should be made to the following detailed description

SUMMARY OF THE INVENTION

Thermally-reversible storage stable gels and sols of liquid and liquefiable hydrocarbons and their mixtures are formed by the heating and admixture of the hydrocarbons with polyethylene block copolymers which contain both crystalline and amorphous segments or blocks.

DESCRIPTION OF THE PREFERRED EMBODIMENT

Polyethylene block copolymers (hereinafter PEBC) and their synthesis were first described in the U.S. Pat. 3,465,063 (now expired) of Hassall et al issued Sep. 2, 1969 and assigned to Shell Oil Company. The patent entitled "Hydrogenated Diolefin Block Copolymers" pertained to the use of these polymeric substances for as elastomers (rubbers). PEBC have been used as thermoplastic elastomers (meltable rubbers) but no use of these materials as gelling agents has been described in the patent or other literature to the best beliefs of the inventor.

Polyethylene block copolymer (PEBC) gelling agents are block copolymers which have macromolecular structures comprising at least two crystalline polyethylene-like "hard" blocks A and at least one amorphous "soft" hydrocarbon block B. Copolymers of this type are described while in U.S. Pat. No. 3,465,063 as having an A-B-A structure, can in fact assume other structures. The proviso is however, that there are at least two "hard" blocks and at least one "soft" block.

Blocks A and B can be arranged in numerous ways. These include but are not limited to:

(1) Triblocks

A—B—A (2) Multiblocks of random or repetitive configuration

A—BB—A—B—AA—B—AAA;

A—BB—A—BB—A—BB—A;

AA—B—AA—B—AA;

(3) Star, often called radial

(4) Graft, often called comb

Other block copolymers suitable for this invention, are disclosed in the aforementioned patent assigned to Shell Oil Co.

In these block copolymers, each crystalline polymeric block A is an essentially linear hydrocarbon polymer with polyethylene-like structure. Block B is an elastomeric hydrocarbon copolymer containing hydrocarbon pendant groups. Each block A and B has a molecular weight of between about 500 and 500,000. In these block copolymers, the "A" blocks comprise between about 10 and 80% by weight of the total copolymer, the balance of the total molecular weight being "B" blocks.

Typically "A" blocks are formed by the polymerization of 1,4-butadiene followed by hydrogenation. The reaction conditions are selected to accomplish predominantly 1,4 polymerization and the suppression of 1,2 polymerization. More details on this procedure are recited in the aforementioned patent, the teachings of which are incorporated herein by reference.

The polyethylene-like block A should be crystalline below its melting point and amorphous above it. The melting point of the A blocks are preferably within the 50°-100° C. range, the exact point being dependent upon its molecular weight and molecular structure.

In order for these blocks to be crystalline, the macromolecules are formed from $CH_2$ groups linked in a predominantly linear chain. Block A may contain some pendant hydrocarbon groups, e.g. pendant ethyl groups, up to approximately 50 wt %. A larger content of pendant groups interferes with block A crystallinity. Thus the structure of the block A is similar to linear polyethylene. As mentioned previously, Block A is formed by polymerization of 1,4-butadiene, followed by hydrogenation. One wants to suppress 1,2 - polymerization since it leads after hydrogenation to pendant ethyl groups, the concentration of which must be below about 50% in the block A to maintain crystallinity.

Blocks B, which are amorphous blocks, may be formed for example, by the predominantly 1,2 polymerization of 1,4 butadiene or by polymerization of isoprene. Blocks B may or may not be hydrogenated, as may be desired. The average molecular weight of the B blocks is within the same range as that of the A blocks. Hydrocarbon blocks containing over 50% pendant hydrocarbon blocks, such as ethyl, methyl, vinyl are examples of amorphous hydrocarbon polymeric segments suitable for this invention. Crystallinity in theses segments is inhibited by presence of pendant groups.

Blocks A and B can be arranged in one of numerous ways, such as any of those illustrated above among others. The overall molecular weight of the polymer may be within the 2,000-10,000,000 range.

The discussion turns now to the hydrocarbons or hydrocarbon mixtures that can be made into gels or sols by the addition of the aforementioned block copolymers, PEBCs. The hydrocarbons or hydrocarbon mixtures to be gelled may be any of (1) a liquid at ambient temperature and pressure or (2) an elevated pressure liquified gas hydrocarbon or (3) a solid hydrocarbon which melts at elevated temperature. Hereinafter for the purposes of this invention all of (1), (2), (3) and their mixtures shall be referred to as LIQUID HYDROCARBONS.

GENERALIZED PREPARATION OF GELS AND SOLS

The liquid hydrocarbon as noted above is heated to a temperature above the melting point of the PEBC gelling agent, usually to a temperature higher than 50°-100° C. The PEBC gelling agent is then dissolved in the liquid hydrocarbon at concentrations in the range of 0.001 to 50% to form a homogeneous solution. This solution is then cooled down or allowed to cool to ambient temperature. The resulting is the formation of a gel. Solid particulate matter, such as powdered aluminum or other inorganic or organic substances can be suspended in the hot solution by addition of such particulates which are about in the 10 to 100 micron range prior to the commencement of cooling. It has been found that the particles will remain suspended indefinitely when the gel forms.

Mention may be made of the following particulate solids that are suitable for suspension in the gels and sols of this invention; namely, powdered metals, (such as Al, Be, Zr); other inorganic materials (such as C, B, $SiO_2$); and oxidizers (such as ammonium perchlorate, RDX, ammonium nitrate); or fillers such as titanium dioxide.

Examples of hydrocarbons and hydrocarbon mixtures suitable for gelling with PEBC gelling agents include but are not limited to: gasoline, kerosene, mineral oils, crude oil, hydrocarbon solvents (such as benzene, toluene, hexane), liquified hydrocarbons, (such as liquified natural gas, methane, ethane, propane), melted, paraffinic waxes, hydrocarbon plasticizers, liquid low molecular weight polymers (such as polybutadiene, polybutylene). Needless to say this list is not exhaustive but is merely exemplary. It is within the skill of the art to determine other suitable liquid hydrocarbons that maybe gelled.

PROPERTIES OF THE COMPOSITIONS

PEBC-hydrocarbon gels are stable at ambient storage conditions for an indefinite time, and any solids suspended therein remain suspended without any apparent settling. Accelerated aging tests show stability of these compositions for 20 years, when maintained above the melting point of the PEBC. PEBC gels undergo a reversible melting phase transition from gel into homogeneous solution at approximately 50°-100° C. range. The actual value of the melting point depends upon the specific PEBC utilized and chemical composition of the liquid hydrocarbon and the concentration of the gelling agent, PEBC as is well understood by chemical practitioners.

The absence of metals and metallic based compounds in the gel and sol compositions of this invention means that there will be no ash residues after burning, and that engine parts in aircraft and other vehicles such as perhaps tanks will not be damaged from ash abrasion. Metallic substances can be used however, as suspended solids in those instances where parts damage is not a factor and/or high temperature burning of the metals and metallic compounds is desirable. Of the metals and metallic compounds suitable for inclusion as suspended material, mention may be made of aluminum, titanium and boron, boron carbide.

Of course non-metallic fillers that serve to change the rheology of these compositions can also be employed. Mention may be made of silicon oxides, titanium dioxide and carbon for example. The presence of fillers, as in the golf balls can also help to reduce costs.

SOLS

Compositions with a lower PEBC content in the liquid hydrocarbon, usually below 1% do not have a gel structure, but rather are more free-flowing. Accordingly they are referred to and are known as sols. The rheology of the gels differs from that of the gels and compositions become free-flowing, as has been alluded to previously.

Example of use of PEBC sols and gels is as antimisting agents with aviation jet fuel.

The following non-limiting examples illustrate the preparation of compositions within the scope of this application.

EXAMPLE I

Method of Preparation of a Kerosene Based Gel

Gel preparation was initiated by soaking 3.0 gms. PEBC-I gelling agent in 97 gms kerosene for 16 hours. Next, the mixture was heated to 100° C. and mixed at 600 rpm until homogeneous solution was formed. Homogeneous solution was then allowed to cool down to room temperature forming thermally-reversible gel with melting point of 81° C.

EXAMPLE II

Preparation of PEBC-I Gelling Agent

PEBC-1 is an ABA triblock polymer having an average molecular weight of about 150,000. The blocks A were quasi polyethylene crystalline blocks of molecular weight of about 38,000 and the center amorphous block was a random copolymer of polyethylene and polybutene-1 of an average molecular weight of about 75,000. These A blocks were produced from material containing predominantly 1,4-polymerized butadiene.

The center B blocks were formed from a mixed 1, 4 and 1, 2-polymerized precursor high in 1, 2-polymerized butadiene. Hydrogenation converted the end block into crystalline polymers similar to low-density polyethylene and the center block into a random copolymer of polyethylene and polybutene-1. Blocks A and B were formed by and joined utilizing a dimethyldichlorosilane coupling agent, to yield a copolymer having 52% A blocks.

EXAMPLE III

Composition of a PEBC Gel

Another example of a kerosene based gel is one that contains 97. weight percent kerosene and 3 weight percent PEBC-II. The PEBC-II had A blocks identical to that in the previous example. The B block was an alternating copolymer of ethylene and propylene with an average molecular wt of about 78,000. The ABA triblock was formed by sequential living polymerization of 1,4-butadiene and isoprene followed by hydrogenation. (Living polymerization is an art recognized term.)

The PEBC copolymer designated PEBC-II contained 28% block A.

EXAMPLE IV

Method of Preparation of Gel with Suspended Matter

A homogeneous solution containing 3 grams of PEBC and 97 grams of kerosene was prepared as shown in Example I. To this was added 100 grams of spherical aluminum powder wherein the average particle size was about 10 microns. The added aluminum was stirred in at about 100°. The solution was allowed to cool down with stirring continuing to retain the aluminum in suspension. A gel formed at approximately 60° C. After the gel formed, stirring was discontinued.

EXAMPLE V

Table 1 illustrates the structures of other PEBC agents that have been used to make the gels recited in Table 2.

TABLE 1

| PEBC TYPE | BLOCK ARRANGEMENT | CRYSTALLINE BLOCK A | AMORPHOUS BLOCK B |
|---|---|---|---|
| I | ABA TRIBLOCK | PREDOMINANTLY POLYETHYLENE | POLY (ETHYLENE-CO-BUTENE-1) |
| II | ABA TRIBLOCK | PREDOMINANTLY POLYETHYLENE | POLY (ETHYLENE-CO-PROPYLENE) |
| III | AB$_5$ STAR | PREDOMINANTLY POLYETHYLENE | POLY (ETHYLENE-CO-PROPYLENE) |
| IV | AB$_6$ STAR | PREDOMINANTLY POLYETHYLENE | POLY (ETHYLENE-CO-BUTENE-1) |

Table 2 illustrates gels that have been prepared using the PEBCs of TABLE 1.

TABLE 2

| HYDROCARBON | PEBC TYPE | WT % | COMPOSITION PROPERTIES |
|---|---|---|---|
| Paraffinic Oil "Tufflo 6016" | I, II | 40, 20 | Elastomer |
| Paraffinic Oil "Tufflo 6016" | I, II | 17, 11, 9 | Elastomeric Gel |
| Paraffinic Oil "Tufflo 6016" | I, II | 6, 5, 3, 2 | Gel |
| Paraffinic Oil "Tufflo 6016" | I, II | 1, 0.5, 0.3, 0.2 | Sol |
| Paraffinic Oil "Tufflo 6016" | III, IV | 5 | Gel |
| Napthenic Oil "Tufflo 100" | I | 3 | Gel |
| Aromatic Oil "Sundex 8125" | I | 3 | Gel |
| Kerosene "RP-1" | I, II | 3, 2 | Gel |
| Kerosene "RP-1" | I, II | 1 | Antimisting sol |
| Fuel "JP-4" | I | 3 | Gel |

TABLE 2-continued

| HYDROCARBON | PEBC TYPE | WT % | COMPOSITION PROPERTIES |
|---|---|---|---|
| Fuel "JP-4" | I | 1 | Antimisting sol |
| Fuel "JP 5" | I | 3 | Gel |
| Fuel "JP 5" | I | 1 | Antimisting sol |
| Fuel "JP 10" | I | 3 | Gel |
| Fuel "JP 10" | I | 1 | Antimisting sol |
| Polybutylene "Oronite 6" | I | 3 | Gel |
| Benzene | I | 3 | Gel |
| Hexane | I, II | 12, 3 | Gel |
| Cyclohexane | I | 3 | Gel |
| Tolnene | I | 3 | Gel |
| Xylene | I | 3 | Gel |
| Paraffinic Wax "Parawax"[a] | I | 20, 10 | Pliable rubbery wax |
| Paraffinic Wax "Shellwax 100"[a] | I | 20, 10 | Pliable rubbery wax |
| Polyethylene Wax "Akrowax PE"[a] | I | 10 | Pliable hard wax |

[a] contains also 15 wt % Tufflo 6016 oil.

EXAMPLE VI

Method of Preparation of a Kerosene Based Sol

Sol preparation was initiated by soaking 0.5 gms PEBC-I gelling agent in 99.5 gms kerosene for 16 hours. Next, the mixture was heated to 100° C. and mixed at 600 rpm until a homogeneous solution was formed. The solution was then allowed to cool down to room temperature. The free-flowing sol had antimisting properties and differential scanning calorimetry (DSC) analysis revealed an endothermal transition at 81° C.

Other examples of sols prepared from PEBC-I and II and various liquid hydrocarbons are shown in Table 2.

EXAMPLE VII

Method of Preparation of Gelled Paraffinic Wax 100 g paraffinic was "Shellwax 100" was melted at 125° C. 25 g of a gumstock consisting of 10 g PEBC-I and 15 g Tufflo 6016 (a paraffinic oil, believed to be made by Arco Chemical Co.) was added to the melted wax at 125° C. and the mixture was agitated until the gumstock dissolved to a homogeneous solution. Then the mixture was allowed to cool down to room temperature solidifying to a pliable rubbery wax.

Other examples of gelled waxes are shown in Table 2.

UTILITY OF THE INVENTIVE COMPOSITIONS

Gelled hydrocarbons have various utilities. The most important of which is the formation of anti-misting aviation fuels. The presence of PEBC agents prevents the breakage of the liquid fuel into ultra fine droplets upon crash impact of an aircraft. This fine droplet formation is a phenomenon known as "misting". PEBC gels and sols of such fuels as aircraft kerosene inhibit the formation of these fine droplets. Thus there is less tendency for the plane to catch fire on crash impact.

Other uses of gelled and sol based hydrocarbons include incendiary compositions such as napalm, to provide easier and safer transportation and storage as well as having the burning fluid stick to the surface of the target rather than flowing off. This property provides a more intense burn.

Gelled hydrocarbons that contain suspended solids, find utility as liquid rocket and ramjet fuels and incendiary compositions.

Another use of these compositions, particularly the gels, of interest to sportsmen is for the "liquid" core of golf balls. This is due to the ready absorption and release of energy by compositions of this invention.

A decorative product that can be made from the compositions of this invention include complex mold molded candles. These are usually available or holidays such as Easter, Halloween, Thanksgiving and Christmas. The gelled paraffin wax would have enhanced moldability and strength and thus it would be possible to fill complex molds. Such properties, as well as the "rubberyness" of these waxes are also beneficial to jewelers and sculptors, such as the Bennett Brothers who use the lost wax process for their fine works of art.

Gelled lubricants such as for sewing machines based on compositions from this invention are also envisioned. These would be easier to apply that liquid ones in some instances.

Crude oil or liquified gasses, such as natural gas can be also gelled for the purpose of transportation and possibly to facilitate recovery of crude oil from wells.

RECAPITULATION

In the present invention, liquid hydrocarbons are converted into gels and sols by the addition with heating, of hydrocarbon gelling agents. The gelling agent class described in the present invention are the polyethylene block copolymers (PEBC). The gels and sols are thermoreversible and melt into homogenous liquids within a narrow temperature range. These compositions may contain suspended particulate matter as has been described in detail. The gels and sols are stable on storage for several years with no separation of the liquid or suspended solids. The compositions of this invention are pumpable both when solids are and are not suspended therein.

Since the gels and sols of this invention are so closely related, differing only as to flowability, the more common term gel shall be considered to apply to both and the claims shall reflect this consideration. It is well known in the art that many if not most liquid hydrocarbons are in fact mixtures of hydrocarbons. For example, jet fuel, kerosene and many waxes are mixtures, and this invention contemplates the use of same.

Since certain changes may be made in the above compositions without departing from the scope of the invention herein involved, it is intended that all matter contained in the above description shall be interpreted as illustrative and not in a limiting sense.

I claim:
1. Thermoreversible gels and sols comprising:
   (a) about 0.01 to 50 wt. % of PEBC, which is polyethylene block copolymer gelling agent having macromolecular structures comprising at least two crystalline "hard" blocks and at least one amorphous "soft " block, and
   (b) balance wt % of a hydrocarbon selected from the group consisting of liquid and liquefiable hydrocarbons.
2. The gel and sol of claim 1 wherein said PEBC gelling agent has both A blocks and B blocks and comprises:
   (a) 2 to 10 blocks A,
   (b) to 10 blocks B, each block having an average molecular weight between about 500 and 500,000, the blocks A comprising between about 10 and 80 wt % of the total copolymer.

3. The gel of claim 2 wherein said block A is a crystalline hydrogenated essentially unbranched homopolymeric block of a conjugated diene having 4-8 carbons per molecule, prior to hydrogenation.

4. The gel of claim 2 wherein said block B is an amorphous homopolymeric block of an alkyl-substituted conjugated diene having 4-8 carbons per molecule.

5. The gel of claim 4 wherein said block B is hydrogenated.

6. The gel of claim 2 wherein said blocks A and B form a triblock copolymer, having an A-B-A structure.

7. The gel of claim 6 wherein said blocks A are quasi polyethylene crystalline blocks of molecular weight of about 38,000 and the center amorphous block is a random copolymer of polyethylene and polybutene-1 of an average molecular weight of about 75,000.

8. The gel of claim 2 wherein said blocks A and B form a multiblock copolymer.

9. The gel of claim 2 wherein said blocks A and B form a copolymer selected from the group consisting of radial and graft copolymers.

10. The gel of claim 1 wherein said hydrocarbon is a liquid at ambient temperature and pressure.

11. The gel of claim 10 wherein the hydrocarbon is selected from the group comprising hexane, benzene, toluene, and kerosene and hydrocarbon mixtures associated with each.

12. The gel of claim 1 wherein said hydrocarbon is a liquified hydrocarbon gas.

13. The gel of claim 1 wherein said hydrocarbon is a melted hydrocarbon solid.

14. The gel of claim 12 wherein said liquified hydrocarbon gas is liquified natural gas.

15. The gel of claim 12 wherein said liquified hydrocarbon gas is selected from the group comprising methane, ethane, propane and butane.

16. The gel of claim 15 wherein the liquified hydrocarbon gas is propane.

17. The gel of claim 1 further comprising up to about 90 wt % suspended particulate matter.

18. The gel of claim 2 further including up to about 90 wt % suspended particulate matter.

19. The gel of claim 2 where in the liquid hydrocarbon is kerosene.

20. The gel of claim 18 wherein the suspended particulate is selected from the group consisting of aluminum, zirconium, boron, silicon dioxide, titanium dioxide carbon, and boron carbide.

21. The gel of claim 1 wherein the polyethylene block copolymer block copolymer which is soluble above its melting point has an A block of a predominantly linear macromolecular structure with low content of the pendant groups, and the block B is a polymeric hydrocarbon segment with a high content of pendent groups, wherein the diving point between high and low is about 50%.

22. The gel of claim 1 wherein the said polyethylene block copolymer block is copolymer is formed by coupling of blocks obtained by predominant 1,2 and 1 1,4 polymerization of butadiene, followed by hydrogenation.

23. The process of producing a thermoreversible gel which comprises dissolving about 0.01 to 50 wt % crystalline hydrocarbon block copolymer gelling agent in at least one hydrocarbon at temperature above the melting point of the gelling agent and forming a gel upon cooling.

24. The process of claim 23 further comprising suspending up to 90 wt % particulate matter.

25. The process of claim 23, including the preliminary step of melting a hydrocarbon to render it liquid prior to the addition of the gelling agent which block copolymer is soluble above its melting point.

26. The process of claim 23, including the preliminary step of liquefying a hydrocarbon gas to render it a liquid, prior to the addition of the gelling agent.

27. The process of preparing an antimisting aircraft fuel which comprises gelling the fuel with a polyethylene block copolymer block copolymer which block copolymer is soluble above its melting point.

28. The process of producing a thermoreversible gel as in claim 23 wherein the crystalline hydrocarbon block copolymer gelling agent is a soluble above its melting point polyethylene block copolymer having A-B-A blocks, and a gel is formed upon cooling to about 20° C.

* * * * *